(12) United States Patent
Treiser

(10) Patent No.: US 8,341,101 B1
(45) Date of Patent: Dec. 25, 2012

(54) DETERMINING RELATIONSHIPS BETWEEN DATA ITEMS AND INDIVIDUALS, AND DYNAMICALLY CALCULATING A METRIC SCORE BASED ON GROUPS OF CHARACTERISTICS

(76) Inventor: Adam Treiser, North Brunswick, NJ (US)

( * ) Notice: Subject to any disclaimer, the term of this patent is extended or adjusted under 35 U.S.C. 154(b) by 0 days.

(21) Appl. No.: 13/461,670

(22) Filed: May 1, 2012

Related U.S. Application Data

(60) Provisional application No. 61/633,246, filed on Feb. 8, 2012.

(51) Int. Cl.
*G06F 17/00* (2006.01)
(52) U.S. Cl. .......................................................... 706/45
(58) Field of Classification Search .................... 706/12, 706/45, 62; 705/7.29, 7.37, 14.4
See application file for complete search history.

(56) References Cited

U.S. PATENT DOCUMENTS

| | | | |
|---|---|---|---|
| 5,710,884 | A | 1/1998 | Dedrick |
| 5,754,938 | A | 5/1998 | Herz et al. |
| 6,510,420 | B1 | 1/2003 | Cessna et al. |
| 6,778,982 | B1 | 8/2004 | Knight et al. |
| 6,990,486 | B2 | 1/2006 | Ma et al. |
| 7,035,855 | B1 | 4/2006 | Kilger et al. |
| 7,117,192 | B2 | 10/2006 | Waltz et al. |
| 7,177,864 | B2 | 2/2007 | Ekhaus |
| 7,365,308 | B2 | 4/2008 | Trcka et al. |
| 7,403,910 | B1 | 7/2008 | Hastings et al. |
| 7,406,434 | B1 | 7/2008 | Chang et al. |
| 7,454,412 | B2 | 11/2008 | Diewald et al. |
| 7,546,278 | B2 | 6/2009 | Yang et al. |
| 7,949,565 | B1 | 5/2011 | Eldering et al. |
| 8,036,930 | B2 | 10/2011 | Brignull et al. |
| 8,046,797 | B2 | 10/2011 | Bentolila et al. |
| 8,082,291 | B2 | 12/2011 | Gisolfi et al. |
| 2003/0033194 | A1 | 2/2003 | Ferguson et al. |
| 2004/0215500 | A1* | 10/2004 | Monahan ........................ 705/10 |

(Continued)

FOREIGN PATENT DOCUMENTS

WO WO2007134128 11/2007

OTHER PUBLICATIONS

Kai-Yu Wang, I-Hsien Ting, and Hui-Ju Wu, *Discovering Interest Groups for Marketing in Virtual Communities*, J Bus Res (2012)—7 pages.

(Continued)

*Primary Examiner* — David Vincent
(74) *Attorney, Agent, or Firm* — Finnegan, Henderson, Farabow, Garrett & Dunner, LLP

(57) ABSTRACT

Systems, apparatus, and methods for correlating two items of interest, based on a plurality of data items and characteristics. The data items may include objective and quantitative data, as well as subjective and qualitative data. In one implementation, the relationship of an individual to a metric is determined. The system, apparatus, and methods may store characteristics describing individuals generally, along with metrics relevant to an organization; receive a plurality of data items; extract information associated with the individual from the data items; determine a number of relationships between the data items, individuals, metric, and characteristics; and use the relationships to determine an overall relationship between the individual and the metric, based on the data and characteristics. In addition, related groups of characteristics may be identified. Similarly, the relationships between any individual, metric, sub-metric, group of characteristics, data item, data source, characteristic, or groups thereof may also be determined.

26 Claims, 14 Drawing Sheets

U.S. PATENT DOCUMENTS

| | | | |
|---|---|---|---|
| 2006/0074832 A1 | 4/2006 | Gardner et al. | |
| 2006/0248087 A1 | 11/2006 | Agrawal et al. | |
| 2009/0006286 A1* | 1/2009 | Angell et al. | 706/12 |
| 2010/0070448 A1 | 3/2010 | Omoigui | |
| 2010/0094858 A1 | 4/2010 | Indeck et al. | |
| 2010/0114899 A1 | 5/2010 | Guha et al. | |
| 2010/0179845 A1* | 7/2010 | Davidson | 705/7 |
| 2011/0015969 A1 | 1/2011 | Loeb | |
| 2011/0213741 A1 | 9/2011 | Shana et al. | |
| 2011/0295694 A1 | 12/2011 | Coggeshall et al. | |
| 2012/0185353 A1* | 7/2012 | Goel | 705/26.5 |

OTHER PUBLICATIONS

Cindy K.Chung et al., *Revealing Dimensions of Thinking in Open-Ended Self Descriptions: An Automated Meaning Extraction Method for Natural Language*, 42 J. Research & Personality 96-132 (2008)—37 pages.

Eric Gilbert and Karrie Karahalios, *Predicting Tie Strengths With Social Media*, ACM CHI '09 Proceedings of the 27th international conference on Human factors in computing systems (2009)—10 pages.

Tom DuBois, et al., *Improving Recommendation Accuracy by Clustering Social Networks with Trust*, 3rd ACM Conference on Recommender Systems workshop: Recommender Systems and the Social Web., (2009)—7 pages.

J. Goldbeck et al., "Predicting Personality with Social Media," Submitted for Review to CHI (2011)—pages.

Paul Gillan, "The New Conversation: Taking Social Media from Talk to Action," *Harvard Business Review* (2010)—24 pages.

Jim Sterne, "Text Analytics for Social Media—Evolving Tools for an Evolving Environment," *White Paper* (2010)—17 pages.

Sarah Perez, "How Twitter Is Pairing Its Interest Graph With Ads," *TechCrunch* (2012)—7 pages.

Michael Chui et al., "The Impact of Big Data on Payments," 2012—7 pages.

Mark R. Gilbert et al. "Planning for 2012: Uncover Synergies from ECM and BI Investments," *Gartner, Inc.*, ID:G002176645 (2011)—5 pages.

* cited by examiner

Figure 13 1300

Screen 2

Individual A
Descriptors

1302

Individual A
Notifications

1304

Individual A
Notes

1306

Communication
Options

1308

Data Sources

1310

DETERMINING RELATIONSHIPS BETWEEN DATA ITEMS AND INDIVIDUALS, AND DYNAMICALLY CALCULATING A METRIC SCORE BASED ON GROUPS OF CHARACTERISTICS

BACKGROUND

This Application claims the benefit of U.S. provisional Application No. 61/633,246, entitled TOOLS AND METHODS FOR DETERMINING RELATIONSHIP VALUES, filed Feb. 8, 2012.

1. Technical Field

The present invention relates to characteristic-based profiling systems and, more particularly, to combining multiple points of data regarding individuals through the use of characteristics in order to determine the relationship between the individuals and a user-defined criteria.

2. Description of the Related Art

Customer profiling systems are known in the art. Traditional systems include consumer rewards cards, credit card purchase information, demographic profiling, behavioral profiling, and customer surveying. Some businesses supplement these traditional systems with website and social media analytic tools that profile the business's fans and followers according to factors such as "likes," "click-through rates," and search engine queries, among others. Generally, these systems attempt to determine products, promotions, and advertisements that are most likely to appeal to a specific customer or broad customer segment. This information helps businesses forecast future market behavior, manage their product portfolio and inventory levels, adjust product pricing, design marketing strategies, and determine human resource and capital investment needs in order to increase revenue, market share, and profitability. For example, advertising targeted at customers who are most likely to purchase a product may be more effective than advertising targeting broader audiences. Likewise, products that are related to one another are likely to be purchased by the same customer and may sell better if offered at the same time, whether as a package or as separate items. Online retailers often use a similar approach, suggesting items that other customers frequently purchase in conjunction with the selected item.

While the prior art approaches create basic customer profiles, these profiles do not reflect the myriad similarities between customers or the numerous ways in which customers can be grouped. For example, the prior art approaches generally provide profiles on either an individual customer or an overly broad customer segment (for example, all women ages 25-34 with a college degree), failing to reflect the various degrees of granularity with which customers can be grouped.

One type of prior art approach typically uses only historical, static, and quantitative or objective information. As a result, customer profiles created by these prior art approaches are generally outdated and inaccurate, and fail to account for the vast amount of potentially rich, but qualitative and subjective, information about the customer that is available to most businesses.

A second type of prior art approach uses only subjective or qualitative information. These approaches also have drawbacks. Typically they use expensive and time-consuming methods such as customer surveys or focus groups. Due to the nature of the setting, the results may not accurately reflect the attitudes or opinions of the surveyed individuals. Due to the expense and time involved, only a limited number of individuals may be surveyed.

Additionally, customer information is often collected with respect to a single business metric and may never be used to glean insights about other metrics that may be helpful to the company. This is particularly true for businesses that are growing and those that have multiple departments. Growing businesses must usually adjust or supplement their performance metrics to reflect new goals, strategies, and business operations. As a result, these businesses must understand how their customers relate to the new set of business metrics rather than, or in addition to, the ones for which the data was originally collected. Similarly, businesses with multiple departments frequently gather customer information for purposes of a department-specific metric, but fail to use that information across other departments or globally within the organization. For example, a business may have a marketing department and risk management department. Customer information gathered by the marketing department when researching new product markets may never be seen or used by the risk management team to determine whether that customer or market poses undue risk to the business. Prior art methods for combining this disparate data, (for example, a technique sometimes referred to as "one version of the truth analysis") do not allow the business to apply the same method to external data it may be interested in. Furthermore, these prior art systems are used only to organize the information and are not useful for analyzing it.

As a result, there is a need for a system that addresses the issues above.

SUMMARY

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

Consistent with an exemplary embodiment of the present invention, there is provided a computer-readable non-transitory storage medium having instructions which, when executed on a processor, perform a method for identifying relationships between individuals, metrics, and sub-metrics, using characteristics. In one embodiment, a method of identifying related characteristics is disclosed. In this method, a computer receives descriptions of individuals; characteristics that define categories of individuals generally; and a metric. The computer gathers data items and calculates a number of relationships between the gathered data and the received items. Based on these relationships, groups of related characteristics can be identified, and output to a user, another system, or stored for future use. Thus, the disclosed method can be used to identify groups of related characteristics. In another embodiment, instructions are contained in a non-transitory computer-readable medium that are operable to execute the disclosed method of identifying related characteristics. In a third embodiment, a computer is disclosed that performs the disclosed method of identifying related characteristics. The computer may contain memory, a network interface, and a processor running software operable to perform the disclosed method. It is to be understood that both the foregoing general description and the following detailed description are exemplary and explanatory only, and are not restrictive of the invention, as claimed. Further features or variations may be provided in addition to those set forth herein. For example, the present invention may be directed to various combinations and sub-combinations of the disclosed features, or combinations and sub-combinations of several further features disclosed below in the detailed descriptions.

BRIEF DESCRIPTION OF THE DRAWINGS

The accompanying drawings, which are incorporated in and constitute a part of this specification, illustrate embodiments and together with the description, serve to explain the principles of the invention. In the drawings:

FIG. 13 is a block diagram depicting a sample detail screen for an individual;

DETAILED DESCRIPTION OF EXEMPLARY EMBODIMENTS

Figure 1:
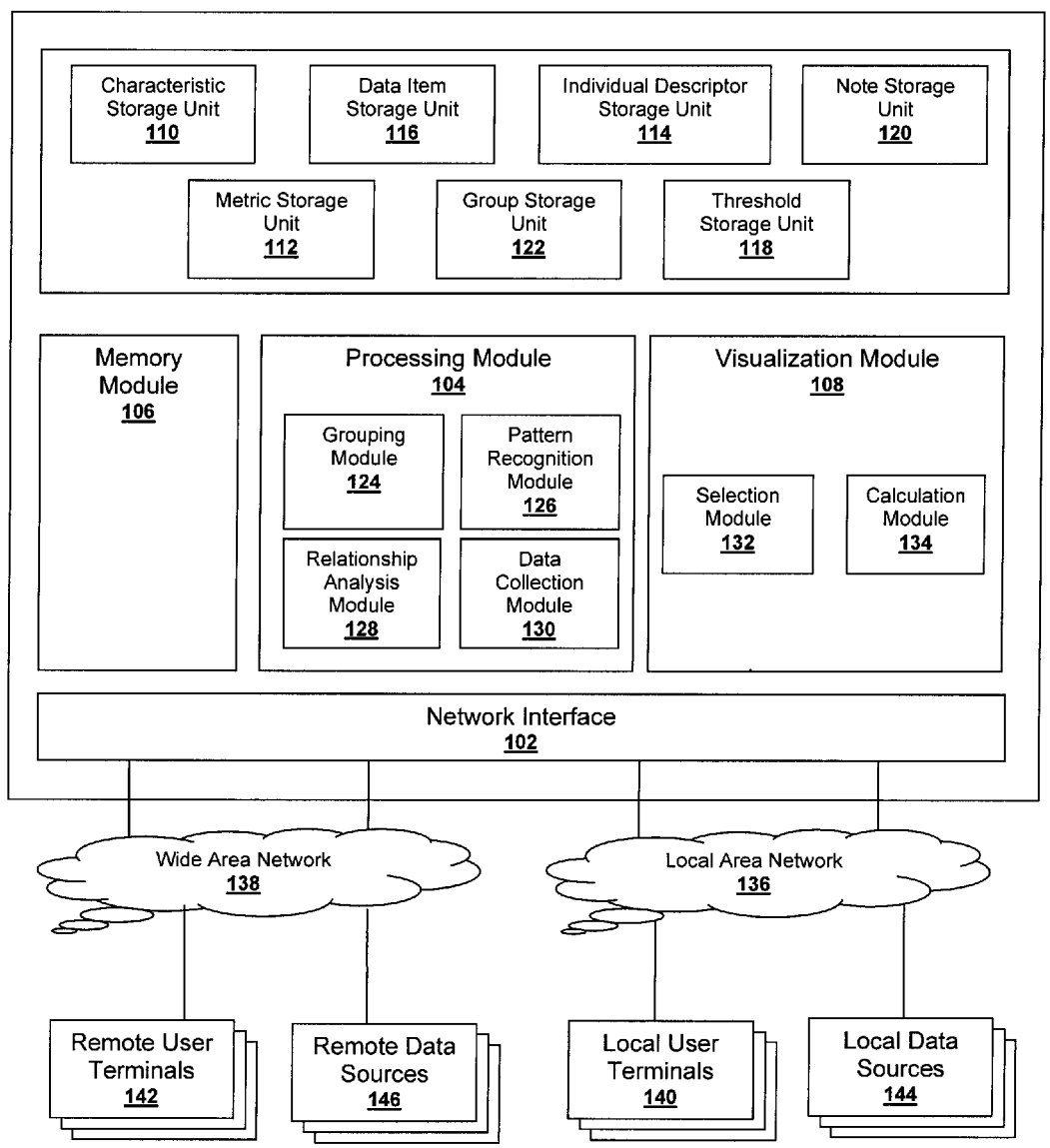
FIG. 1 is a block diagram of an exemplary embodiment of a characteristic-based server.

Reference will now be made in detail to an exemplary embodiment of the invention, an example of which is illustrated in the accompanying drawings. Wherever possible, the same reference numbers will be used throughout the drawings to refer to the same or like parts. It is apparent, however, that the embodiments shown in the accompanying drawings are not limiting, and that modifications may be made without departing from the spirit and scope of the invention.

Systems and methods consistent with the invention provide a characteristic-based system for identifying, organizing, describing, and visualizing relationships between a business's metrics and individuals. To this end, the characteristic-based system may define a number of characteristics. As used herein, the term characteristic broadly refers to any attribute, trait, value, or other factor associated, whether objectively or subjectively, with an individual or group of individuals. The detailed description below provides further examples of such characteristics. When receiving information about an individual, the characteristic-based system may use a suitable relationship-determining module (i.e., a software component, a hardware component, or a combination of a software component and a hardware component) comprising relationship-determining algorithms known in the art to determine the relationship between the information and the characteristics. This relationship may be described using both a magnitude and a direction. Further, the description may be represented by a numerical value, textual identifier, graphical icon, color, opacity, or any other suitable method of representing the relationship. The magnitude may represent how strongly the information is related to the characteristics, including the lack of any relationship at all. The relationship may also be identified as positive, negative, or neutral. The term "positive" broadly refers to relationships where the existence of, or a change in, one member of the relationship corresponds to a similar existence of, or a similar change in, the other members. The term "negative" broadly refers to relationships where the existence of, or a change in one member of the relationship corresponds to a lack of the existence of, or an inverse change in, the other members. The term "neutral" broadly refers to a relationship where the existence of, or a change in one member of the relationship does not correspond to any existence or change in the other members.

The system may also receive a plurality of descriptors, identifying or describing specific individuals. The system may use a similar relationship-determining module to identify which individual, or individuals, are the most strongly related to the information. Again, the relationships may include a magnitude, and/or a direction identified as positive, negative, or neutral. In this way, the system may further determine the relationship between the individuals and the characteristics. These relationships may be accumulated over time to develop a better understanding of the individual, based on multiple data points.

Further, the system may use the relationship-determining modules to identify new relationships and patterns in the data. The system may use these relationships and patterns to create new characteristics, which will be used when evaluating the received data. Likewise, over time the system may identify characteristics that generally do not relate to the data. It may flag these characteristics as irrelevant with respect to certain data or relationships. The system may then skip the irrelevant characteristics, increasing performance.

The system may also use the relationship-determining module to identify characteristics that are related to each other. The system may group these related characteristics together, as a group of characteristics. Any title may be given to this group of characteristics, or to the group of individuals, data, data sources, or metrics that have a strong relationship with that group of characteristics. The system may use the relationship-determining module to determine the relationships between the groups of characteristics and the characteristics, data, individuals, and the other groups of characteristics. In this manner, personality types may be identified and analyzed.

In addition, the system may receive a metric, representing an overall goal or interest of a particular organization. As used herein, the term metric broadly refers to any attribute, measurement, goal, strategy, or other information of interest to an organization. The metric may also consist of a number of sub-metrics. As used herein, the term sub-metric broadly refers to any attribute, measurement, goal, strategy, or other information related to the metric. The system may use a suitable relationship-determining module to identify the relationship between the metric and the characteristics. In this way, the system may further determine the relationship between the metrics and the individuals. The system may also determine the relationship between groups of characteristics and the metric, and individuals and the metric. In this manner, the organization may gain information on how personality types or individuals contribute to the metric it is interested in.

Further, a visualization module (i.e., a software component, a hardware component, or a combination of a software component and a hardware component) may be used to develop a representation of any relationship or group of relationships. The user may select two areas of interest. The selections may comprise one or more metrics, sub-metrics, characteristics, groups of characteristics, individuals, data items, data sources, or any grouping of the same. Once both selections have been made, the system may use the relationships for those selections to calculate an overall relationship between the two. The system may then represent this overall relationship as a single value or descriptor. Further, the user may assign weights to one or more of the selection items, or change the assigned weights. When the weights are changed, the system may re-calculate all relationships and values associated with the weights. The system may use these weights accordingly when calculating the overall relationship between the selections. The system may also determine the relationships between one selection and the underlying items comprising the other selection. The system may then compute a single value or descriptor for the underlying items. In this manner, the user is able to determine how the underlying items contribute to the overall relationship between the selections.

The system may also receive a plurality of threshold criteria. As used herein, the term threshold criteria broadly refers to any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed. The system may output notifications when any threshold criteria are met.

FIG. 1 is a block diagram of an exemplary embodiment of a characteristic-based server 100. One skilled in the art will appreciate that system 100 may be implemented in a number of different configurations without departing from the scope of the present invention. As shown in FIG. 1, characteristic-based system 100 may include a network interface 102, a memory module 106, a processing module 104, a visualization module 108, and one or more interconnected information storage units, such as, for example, a characteristic storage unit 110, a metric storage unit 112, an individual descriptor storage unit 114, a data item storage unit 116, a threshold criteria storage unit 118, a note storage unit 120, and a group storage unit 122. While the information storage units in the embodiment shown in FIG. 1 are interconnected, each information storage unit need not be interconnected. Moreover, rather than separate storage units, characteristic-based server 100 may include only one database that would include the data of storage units 110-122. Likewise, while the data storage units are shown as part of server 100, in another embodiment, one or more storage units may be separate units, connected to server 100 through network interface 102.

Network interface 102 may be one or more devices used to facilitate the transfer of information between server 100 and external components, such as user terminals 140, 142 and data sources 144, 146. Network interface module 102 may receive user requests from local user terminal 140 or remote user terminal 142, and route those requests to processing module 104 or visualization module 108. In exemplary embodiments, network interface module 102 may be a wired or wireless interface to a local-area network connecting one or more local user terminals 142 and local data sources 144, or wide-area network such as the internet, connecting one or more remote user terminals 142, or remote data sources 146. Network interface module 102 may allow a plurality of local user terminals 140 and remote user terminals 142 to connect to the system, in order to make selections and receive information, alerts, and visualizations. Network interface module 102 may also allow the system to connect to one or more local data sources 144, on a local-area-network, or remote data sources 146, on one or more remote networks.

Memory module 106 may represent one or more non-transitory computer-readable storage devices that maintain information that is used by processing module 104 and/or other components internal and external to characteristic-based server 100. Further, memory module 106 may include one or more programs that, when executed by processing module 104, perform one or more processes consistent with embodiments of the present invention. Examples of such processes are described below with respect to FIGS. 1-16. Memory module 106 may also include configuration data that may be used by processing module 104 to present user interface screens and visualizations to user terminals 140 and 142. Examples of such screens are described in greater detail with respect to FIGS. 9-16.

Processing module 104, as shown in FIG. 1, may further include a data collection module 130, a grouping module 124, a pattern recognition module 126, and a relationship analysis module 128. Data collection module 130 may include components for collecting data items from data sources, using network interface 102. As described in more detail below, data items collected by the data collection module may include any information pertaining to an individual. Relationship analysis module 128 may include components for determining the existence and strength of a relationship between two items. For example, and as described in greater detail below, relationship analysis module 128 may include a natural-language processing component for determining the relationship between two items. Grouping module 124 may include components for identifying groups of related items. For example, and as described in greater detail below, grouping module 124 may use relationships identified by relationship analysis module 128 to identify groups of related items. Pattern recognition module 126 may include components for identifying patterns in the received data. For example, and as described in greater detail below, pattern recognition module 126 may include pattern recognition algorithms known in the art to identify new characteristics based on patterns of received data.

As shown in FIG. 1, characteristic-based server 100 may also include a plurality of interconnected storage units, 110-122. In this regard, server 100 may include a storage unit module (not shown) having components for controlling access to storage units 110-122. Such a storage unit module may include a query function that, in response to a match request, may query information stored in one or more of storage units 110-122 to identify characteristics, data items, or metrics meeting specified criteria. Storage units 110-122 may be configured using any appropriate type of unit that facilitates the storage of data, as well as the locating, accessing, and retrieving of data stored in the storage units.

Characteristic storage unit 110 may store general characteristics of individuals. As used herein, the term characteristic broadly refers to any attribute, trait, value, or other factor associated, whether objectively or subjectively, with an individual or group of individuals. For example, a characteristic may reflect a number of attributes that may be applicable to one or more individuals, such as types of previously or currently held fields of work (e.g., salesperson), professional or personal values (e.g., environmentalism), location (e.g., New York), social interactions (e.g., trendsetter), emotional traits (e.g., generally negative), user-defined characteristics, or others.

Data item storage unit 116 may store data collected by data collection module 130. Data item storage unit 116 may also store metadata associated with the data items, describing the data items. For example, metadata may include the data source the data item was collected from, the time the data item was posted or created, the time the data item was collected, the type of data item (e.g., a blog post), or the individual with which the data is associated. Data item storage unit 116 may also store data items received, or created by characteristic-based server 100.

Metric storage unit 112 may store metrics and sub-metrics for an organization. As used herein, a metric broadly refers to any measurement, criteria, goal, or information of interest to an organization. For example, a given organization may be interested in "brand awareness," or how likely a given person is to recognize the organization's brand. The metric may also be comprised of sub-metrics. As used herein, a sub-metric refers to any information related to a metric. For example, sub-metrics related to brand awareness may include "internet mentions" for that brand, how widely those mentions are distributed, how the mentions describe the brand, number of sales, or others.

Individual descriptor storage unit 114 may store descriptors of specific individuals. As used herein, an individual descriptor includes any information that identifies a specific individual, as opposed to a group of people. Descriptors may include names, addresses, employee numbers, drivers license numbers, credit card and other banking account information, social security numbers, behavioral profiles, relationship or social network information, linguistic styles or writing, voice recognition, image recognition or any other unique identifiers. In this manner, each descriptor or group of descriptors may be used to identify a unique individual.

Threshold criteria storage unit 118 may store the threshold criteria used to determine when a notification should occur. Threshold criteria may include any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed.

Note storage unit 120 may store notes, consisting of information entered by one or more users, that are associated with one or more individual descriptors, groups, relationships, metrics, sub-metrics, data items, or data sources. The information may include textual, graphical, audio, or video information. For example, a user may enter a description of a specific group, as the "treehugger" group. This description may allow users to more easily refer to, and understand the characteristics that comprise that group.

Group storage unit 122 may store groups, consisting of a plurality of characteristics, or other groups. These groups may allow users to more easily identify and understand categories of individuals.

Visualization module 108, as shown in FIG. 1, may further include a selection module 132 and a calculation module 134. Selection module 132 may include components for receiving user selections from network interface module 102. For example, selection module 132 may allow users on remote terminals to make selections. User selections may consist of one or more individual descriptors, metrics, sub-metrics, characteristics, groups, data items, data sources, or groups thereof. Calculation module 134 may include components for determining the relationships between the selected groups and the remaining groups, data items, metrics, sub-metrics, characteristics, data sources, and individuals. This may include using the relationships to calculate an overall relationship for a group with respect to the other groups, data items, metrics, characteristics, data sources, and individuals. Calculation module 134 may also receive weights associated with a group, data item, metric, sub-metric, characteristic, data source, or individual, and use the weights in conjunction with the stored relationships when determining the overall relationship for a selection. Visualization module 108 may use the calculated values for a selection to build a screen containing at least one selection, and a representation of the overall relationship between that selection and at least one other selection. Visualization module 108 may also include additional information about the selection in the screen. For example, and as discussed in more detail below, selection module 132 may receive a selection of an individual and a selection of a metric. Calculation module 134 may determine the overall relationship between the individual and metric based on the stored relationships. Visualization module 108 may return a screen containing information about the individual and a single descriptor of the overall relationship.

Characteristic server 100 may consist of a single computer or mainframe, containing at least a processor, memory, storage, and a network interface. Server 100 may optionally be implemented as a combination of instructions stored in software, executable to perform the steps described below, and a processor connected to the software, capable of executing the instructions. Alternatively, server 100 may be implemented in a number of different computers, connected to each other either through a local-area network (LAN) or wide-area network (WAN). Data collection module 130 may optionally comprise search engine tools known in the art, operable to find data sources and data items relevant to the search criteria, such as an individual. Storage units 110-122 may comprise any computer-readable medium known in the art, including databases, file systems, or remote servers.

Figure 2:
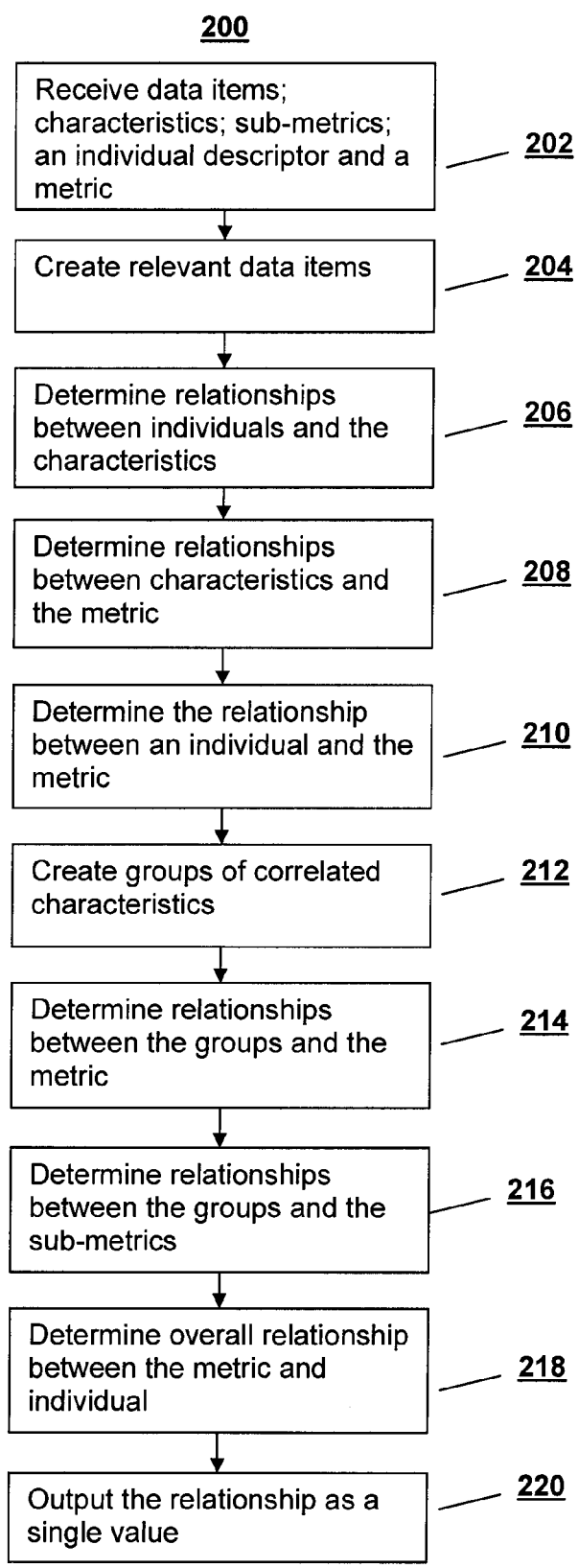
FIG. 2 is a flowchart depicting one process for determining a relationship score for an individual relative to a metric.

FIG. 2 is a flowchart demonstrating an exemplary process 200 for characteristic-based profiling consistent with the present invention. For example, characteristic-based system 100 may use process 200 to determine the relationship between an individual, or groups of individual descriptors, and a user-specified metric based on a number of characteristics. As shown in FIG. 2, process 200 may begin by receiving a number of characteristics, an individual descriptor, and a metric. A metric broadly refers to any measurement, goal, interest, parameter, or other information that an organization may be interested in learning.

In one embodiment, the metric will be an overall goal or measurement related to a business. In this embodiment, the system uses the data and characteristics to obtain information about existing and potential customers that are positively and negatively related to the metric. However, the system may also be used to identify other factors related to the metric, such as characteristics, groups of characteristics, data sources, or sub-metrics. By recognizing new characteristics as data is processed, the system may also identify new, previously unknown, customers or groups of customers related to the metric. For example, the system may use a pattern recognition module 126, described above, to determine patterns of data that are not defined as characteristics, but which occur on a regular basis. Once recognized, the system may automatically define these patterns as new characteristics.

As discussed above, characteristics broadly refer to any attribute, trait, value, or other factor associated, whether objectively or subjectively, with an individual or group of individuals. For example, characteristic types may comprise: social network (influencer, follower, etc.); sentimental (positive, neutral, etc.); temperamental (emotionless, dramatic, etc.); attitudinal (health conscious, eco-friendly, etc.); psychographic (personality factors, personality-derived factors, etc.); demographic (age, gender, etc.); transactional (past purchases, rewards, etc.); firmographic (employment, rank, etc.); data item attributes (data source; author, etc.); cognitive dimensions of thinking (i.e., evaluative, schedule-driven, etc.), or other descriptions of groups or categories of people. A characteristic may be an objective factor, such as age or income, a subjective factor, such as "eco-friendly," or a combination of objective and subjective factors. These characteristics are typically selected by a user, based on known templates, or on the types of individuals they believe will be relevant to one or more metrics or sub-metrics. Alternatively, or in addition, and as described in more detail below, the system itself may identify characteristics that are relevant to the metric as it analyzes the data items. These characteristics may also be obtained or purchased from other data sources, such as marketing databases, or public websites, discussion boards, or databases.

Individual descriptors broadly refer to any information that may be used to identify a specific individual, including account information, license numbers, phone numbers, email addresses, name, relationship information, behavioral profile, nicknames or aliases, or any information that may be used to differentiate one individual from a group. These descriptors may be received from organizations, users, or internal or external data sources, as described below. Further, an individual descriptor may contain multiple pieces of information that collectively identify a specific person. For example, an individual descriptor may consist of a name, driver's license number, credit card account number, and street address, which may be used collectively to identify a specific person. This example is not limiting, and any information that uniquely identifies an individual may be part of an individual descriptor. For another example, an individual descriptor may consist only of social network information, which describes a person by their social or business relationships to others.

At step 202, the system may receive a plurality of data items, characteristics, sub-metrics, an individual descriptor, and a metric. The data items may be received from a plurality of data sources. At step 204, the system may create relevant data items for the individual. In one embodiment, the system accesses all data sources that may have relevant information about the metric. These data sources may comprise internal data sources (e.g. crm, payroll, etc.), privately-shared sources (e.g., suppliers, partners, etc.), user-authorized data sources (e.g., social media accounts, etc.), public data sources (e.g., blogs, tweets, etc.), or purchased data sources (e.g., data aggregators, credit card db, etc.). As discussed above, the purchased data sources may also contain characteristics, metrics, or individual descriptors. In another embodiment, the system may only access data from sources that have been marked as relevant for one or more individual descriptors, metrics, groups, or sub-metrics.

In general, data sources may contain both structured and unstructured data, which may be qualitative and subjective, quantitative and objective, or a combination of both. Structured data broadly refers to any data that is placed into a pre-existing structure such as a database, spreadsheet, or form. Unstructured data broadly refers to data that does not have a defined structure, such as prose, news articles, blog posts, comments, messages, emoticons, images, video, audio, or other freely-entered data. Quantitative and objective data broadly concerns factual, measurable subjects. For example, quantitative data may be described in terms of quantity, such as a numerical value or range. In comparison, qualitative and subjective data broadly describes items in terms of a quality or categorization wherein the quality or category may not be fully defined. For example, qualitative and subjective data may describe objects in terms of warmth and flavor.

The system may use an appropriate relationship-determination module (i.e., a software component, a hardware component, or a combination of a software component and a hardware component), utilizing techniques known in the art, to determine the strength of the relationship between the data items and the individuals. This relationship strength consists of a number or descriptor indicating the magnitude of the relationship. The strength of the relationship represents how strongly the data item is related to a specific individual descriptor. For example, a data item discussing the name, address, and family members of the individual would have a strong relationship to an individual descriptor containing the same information. Likewise, a data item that did not mention any of the information comprising the individual descriptor would not have a strong relationship to that descriptor. In this manner, the system may determine which individuals are associated with the data item. The system may also use other methods to identify the individual associated with, or likely to be associated with a data item. For example, the data item may be associated with a known individual descriptor, such as a username, account, or name.

These data items will be strongly correlated with any individual descriptor containing a matching user name, account, or name. In another embodiment, the system may determine when the data item refers to a pseudonym, or includes missing information about an individual. For example, when a data item strongly relates to a known descriptor, but the names do not match, the system may use additional methods to determine whether the two individuals are the same. In such a case, the system may create a pseudonym item, containing a descriptor of the individual associated with the data item. If additional data items are also found to have a strong relationship to both the individual descriptor and the pseudonym, the system may add the information from the pseudonym to the individual descriptor. In this manner, future data items relating to the pseudonym may be identified with the individual. If no strong relationship is found, the system may use the pseudonym to create a new individual descriptor.

The system may automatically use the pseudonym to create a new individual descriptor, or add the pseudonym information to an existing individual descriptor, if threshold relationship strengths are met. For example, if the relationship strength between the pseudonym and the descriptor reaches a set value, the system may automatically merge the two. Likewise, if the relationship strength falls below a certain threshold, the system may automatically create a new descriptor based on the pseudonym. This behavior is not limited to names, and the system may perform this action when any of the information in the individual descriptor does not match the information in the data item. In this manner, the system is capable of collecting new information about the individuals, as well as recognizing new individuals.

If a strong relationship exists between the data item and an individual descriptor, the system creates an association between the data item and the individual descriptor. The system will also mark the data source as relevant to the individual descriptor, so that it may be identified more quickly in the future. The system will next use an appropriate method known in the art, such as, for example, natural language processing, to identify the portions of the data item that are relevant to the individual. The system uses the relevant data portions to create a new data item, containing only the data relevant to one or more individual descriptors. In this embodiment, only the relevant data items will be analyzed.

At step 206, the system uses a suitable relationship-determining module (i.e., a software component, a hardware component, or a combination of a software component and a hardware component) to determine the relationship between the individual descriptors and the characteristics. The relationship-determining module may comprise algorithms known in the art, including one or more of; natural language processing, textual analysis, contextual analysis, direct 1-to-1 mapping, artificial intelligence, image analysis, speech analysis or other suitable techniques known for determining correlations, patterns, or relationships. The relationship consists of a magnitude, indicating the strength (or lack thereof) of the relationship, and a direction, indicating whether the relationship is positive, negative, or neutral. As used in this application, the direction simply indicates whether a given relationship represents a positive correlation (i.e. positive direction), a negative correlation (i.e., negative direction), or no correlation (i.e. neutral direction). For example, an individual who has repeatedly shown "eco-friendly" behavior and attitudes will be positively correlated with an "eco-friendly" characteristic. In this case, the characteristic and individual descriptor would have a strong, positive relationship. Similarly, an individual who displays hostility towards "eco-friendly" topics and ideas would be negatively correlated with the "eco-friendly" characteristic. The individual descriptor for this person would have a strong negative relationship with the "eco-friendly" characteristic. Finally, an individual who did not correlate to the "eco-friendly" characteristic would have a neutral relationship with it.

Figure 3:
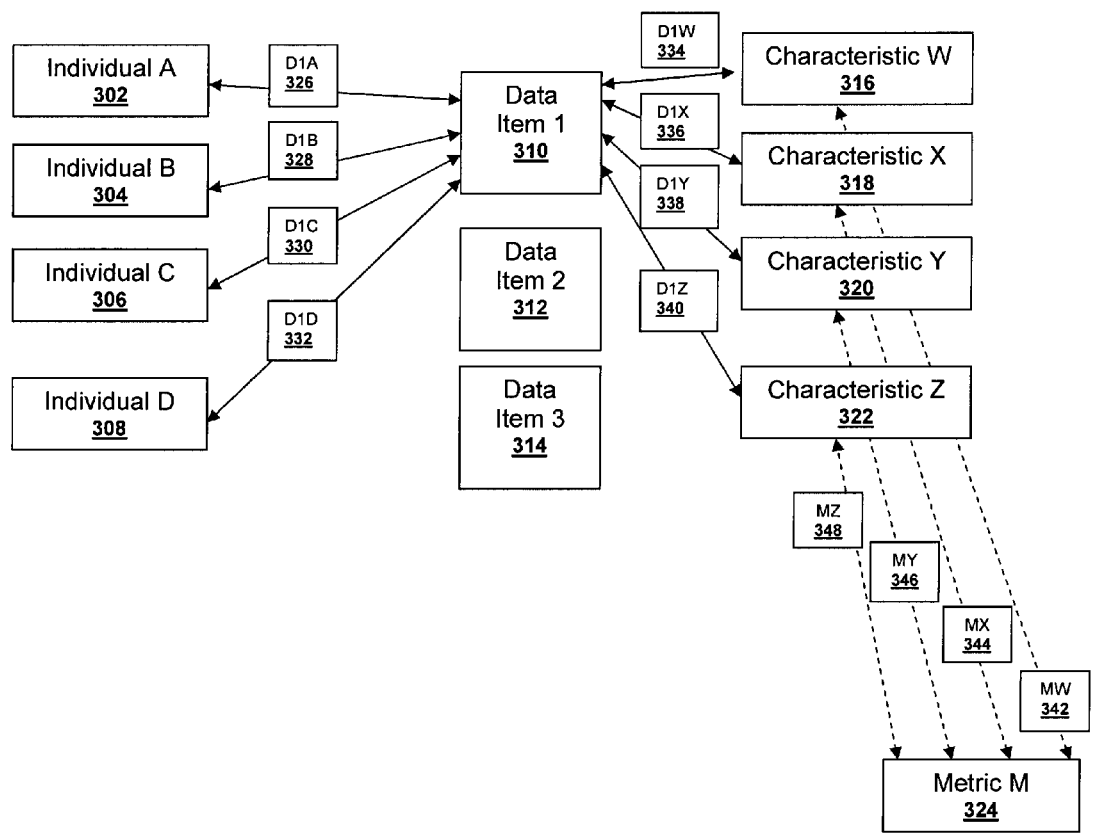
FIG. 3 is a block diagram depicting an example of relationships between characteristics, metrics, data items, and individuals.
Figure 4:
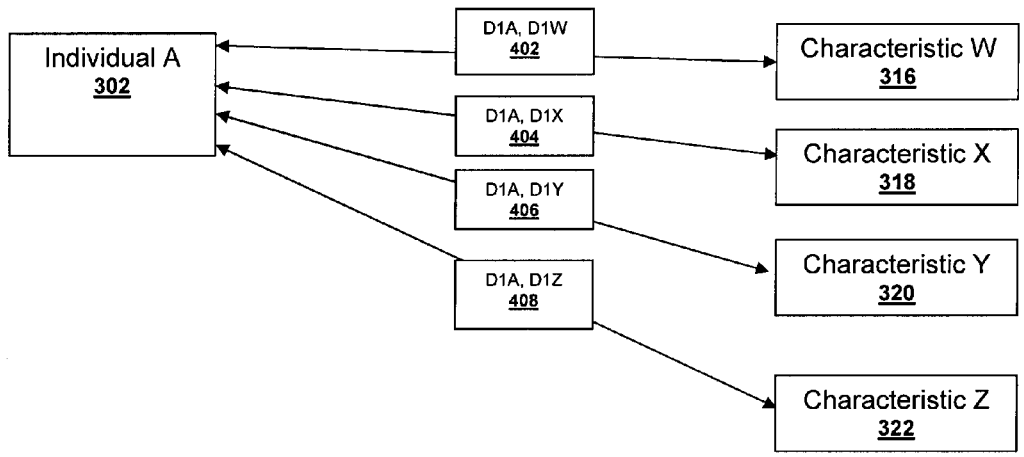
FIG. 4 is a block diagram depicting an example of relationships between individuals and characteristics.

To determine this relationship, the system may use a relationship-determining technique known in the art to determine the relationship between the data items and the characteristics. This relationship may consist of a magnitude and a direction. The system may also calculate a value for a characteristic based on the relationship between the characteristic and the data item, and the relationship between the data item and the individual descriptor. This is represented in FIG. 3, items 326-332 (first set of relationships) and 334-340 (second set of relationships). For example, the relationship between individual A 302 and characteristic W 316 will be determined based on second relationship D1W 334 and first relationship D1A 326; where second relationship D1W 334 represents the relationship between characteristic W and data item 1 310, and first relationship D1A represents the relationship between data item 1 and individual A. The combined relationships will be stored with the characteristics, and associated with the individual descriptor as shown in FIG. 4. The combined scores based on D1A, D1W, 402 to D1A, D1Z 408 are associated with the relationship between individual A 302, and characteristics W 316 to Z 322.

Figure 5:
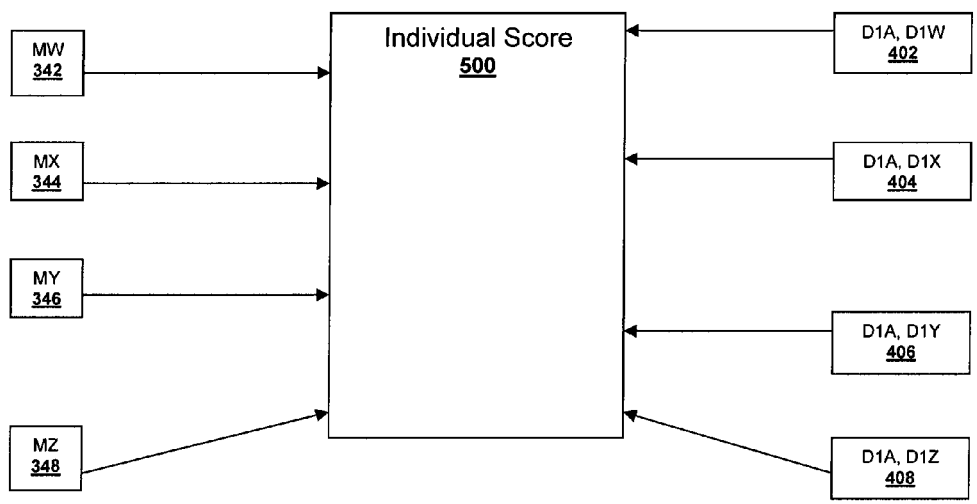
FIG. 5 is a block diagram depicting an example score for an individual related to a metric.

Returning now to FIG. 2, at step 208, the system may also determine the relationship between the characteristics and the metric. This relationship may also consist of a magnitude and direction, as described above. The system may determine this relationship using a suitable relationship-determining module (i.e., a software component, a hardware component, or a combination of a software component and a hardware component), known in the art. FIG. 5 illustrates an example of the third set of relationships determined between characteristics W 316 to Z 322, and metric M 324, represented by MW 342 to MZ 348 respectively.

At step 210, the system may determine the relationship between individual descriptor 302 and metric 324. The system may determine this relationship using a suitable relationship-determining module, as described above. This relationship may also consist of a magnitude and direction, as described above. As shown in FIG. 5, this relationship may be determined based on the relationships between characteristics 316-322 and metric 324, represented by MW 342 to MZ 348, and the relationships between the individual 302 and characteristics 316 to 322, represented as D1A, D1W 402 to D1A, D1Z 408 (the sixth set of relationships).

At this point, the system may output individual-metric relationship 500, representing the strength of the relationship between individual 302 and metric 324. This score may be represented as a numerical value, a descriptor, an image, or any other means of conveying the overall magnitude and/or direction of the relationship between individual 302 and metric 324.

Figure 6:
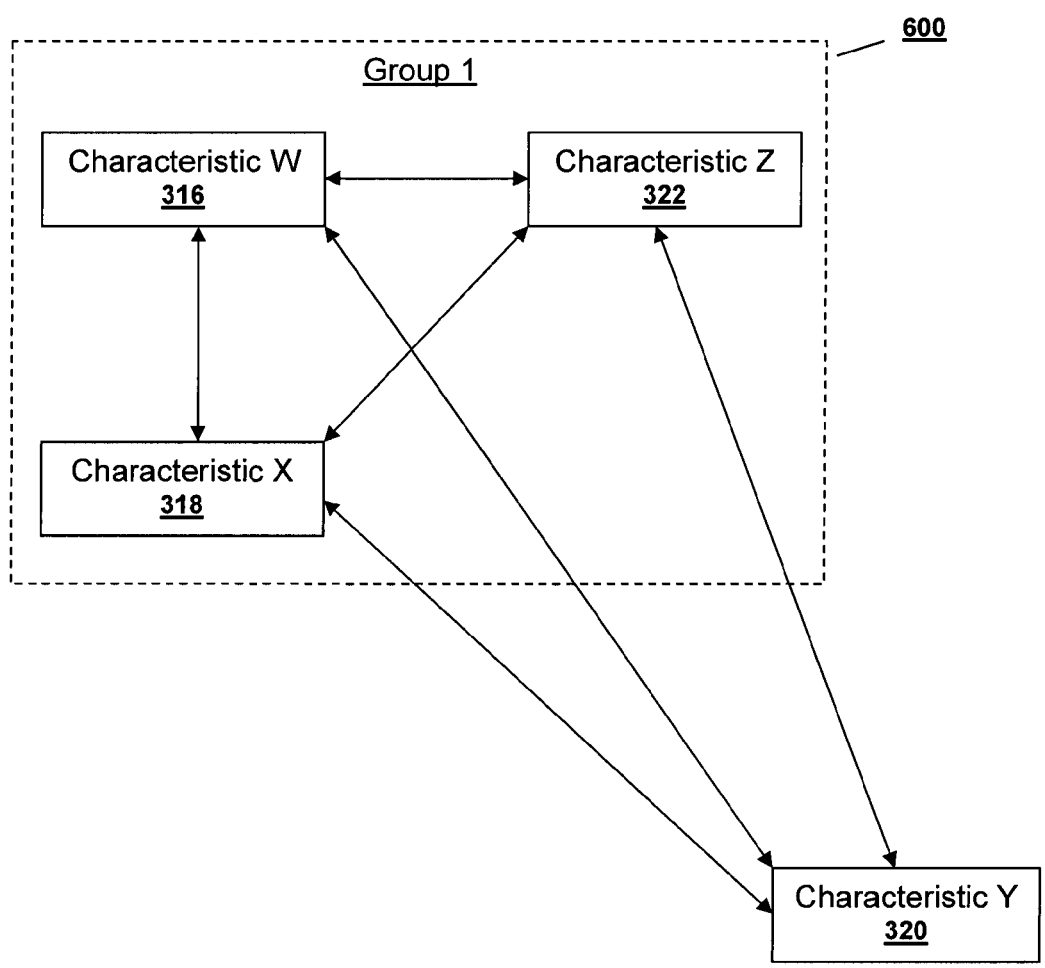
FIG. 6 is a block diagram depicting an example group of characteristics.

In another embodiment, the system may identify groups of characteristics, in order to determine the relationship between the groups and the metric. In this embodiment, the system may also use a suitable relationship-determining module, as described above, to determine the relationships between the characteristics. At step 212 in FIG. 2, the system may identify groups of characteristics that have strong relationships to each other using grouping module 124. As shown in FIG. 6, characteristics W 316, X 318, and Z 322 are strongly related, and the system may group them into group 1 600. Because characteristic Y 320 is not strongly related to the others, the system may not include it in group 1 600.

Figure 7:
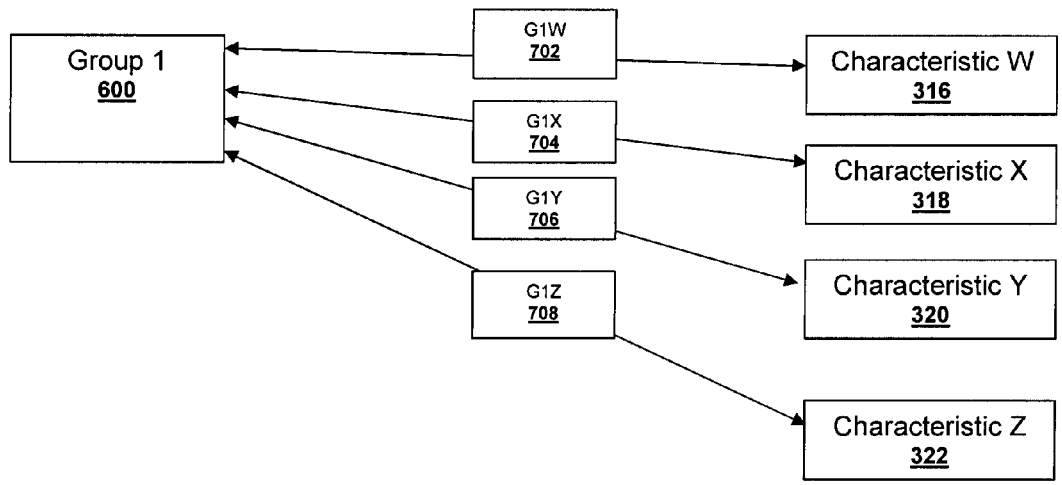
FIG. 7 is a block diagram depicting an example of relationships between groups and characteristics.
Figure 8:
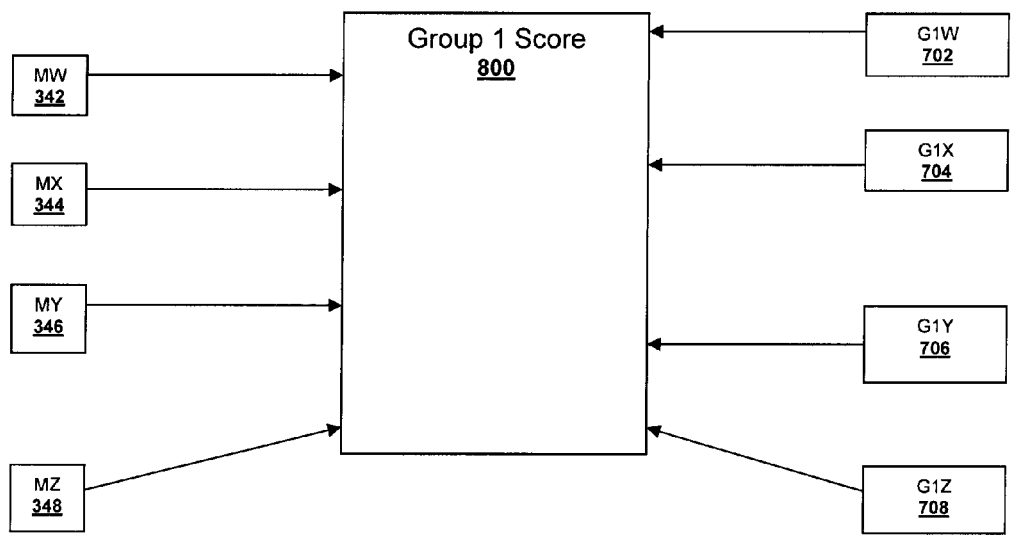
FIG. 8 is a block diagram depicting an exemplary score for a group.

At step 214 in FIG. 2, the system may also determine the relationship between the groups and the metric, based on the underlying characteristics. For example, the system may use a suitable relationship-determining module, as described above, to determine the relationships between the groups and the characteristics. For example, as shown in FIG. 7, the system determines a fourth set of relationships G1W 702 to G1Z 708 based on the relationship between group 1 600 and characteristics W 316 to Z 322. As described above, the relationship may contain a magnitude and direction. As shown in FIG. 8, the system may determine the group-metric relationship 800 (one of the fifth set of relationships) between group 1 600 and metric 324 based on the third set of relationship values MW 342 to MZ 348 and the fourth set of relationships G1W 702 to G1Z 708. As described above, the system may output group-metric relationship 800, which may be represented as a numerical value, a descriptor, an image, or any other means of conveying the magnitude and/or direction of the relationship.

Figure 9:
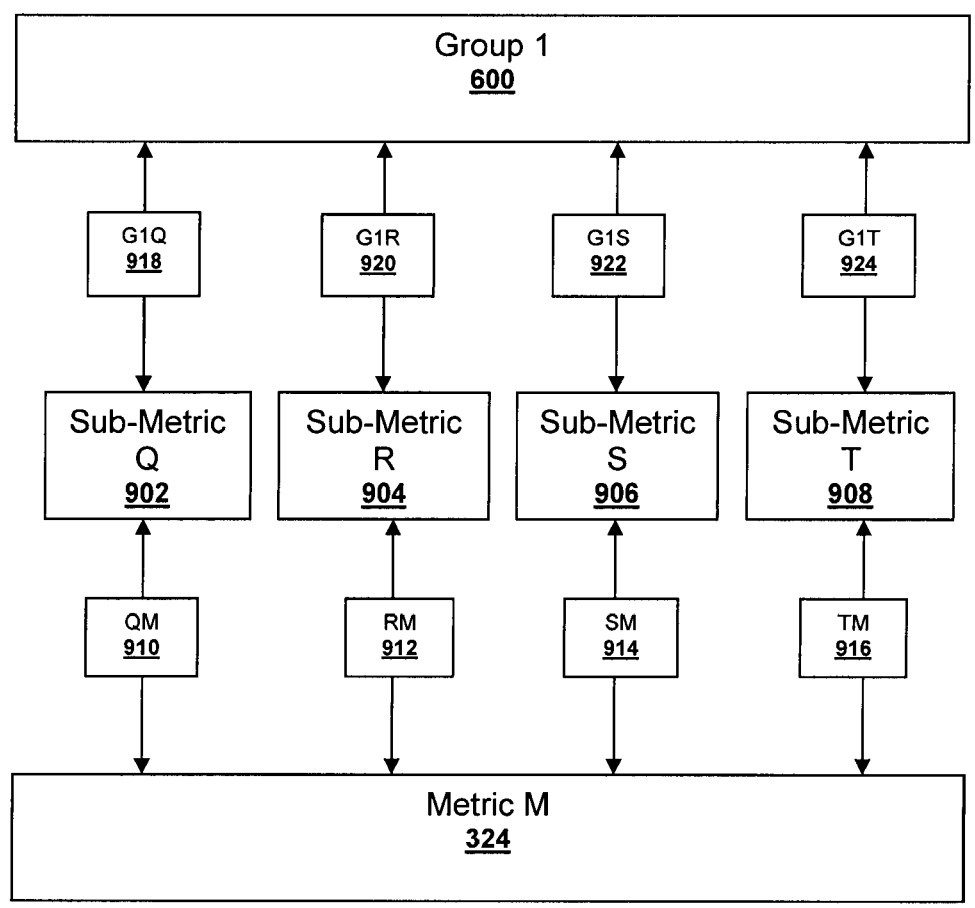
FIG. 9 is a block diagram depicting relationships used to determine sub-metric scores.

In yet another embodiment, the system may also determine the relationship between the sub-metrics and the metric. For example, at step 216, the system may also use a suitable relationship-determining module, as described above, to determine the relationships between the groups of characteristics and the sub-metrics. For example, as shown in FIG. 9, the system may determine a tenth set of relationships, the metric-sub-metric values QM 910 to TM 916 based on the relationship between metric M 324 and sub-metrics Q 902 through T 908. The system may also determine a ninth set of relationships, the group-sub-metric values G1Q 918 through G1T 924, based on the relationships between group 1 600 and sub-metrics Q 902 through T 908. As described above, the relationship may contain a magnitude and direction. The system may also determine the overall relationship score for the sub-metrics, based on the group-sub-metric values and metric-sub-metric values. For example, the system may determine an overall relationship for sub-metric Q 902 to metric M 324 based on G1Q 918 and QM 910. The system may output this information, as described above. In this manner, the system may determine which of the sub-metrics have the strongest relationship to the overall metric M 324.

Figure 10:
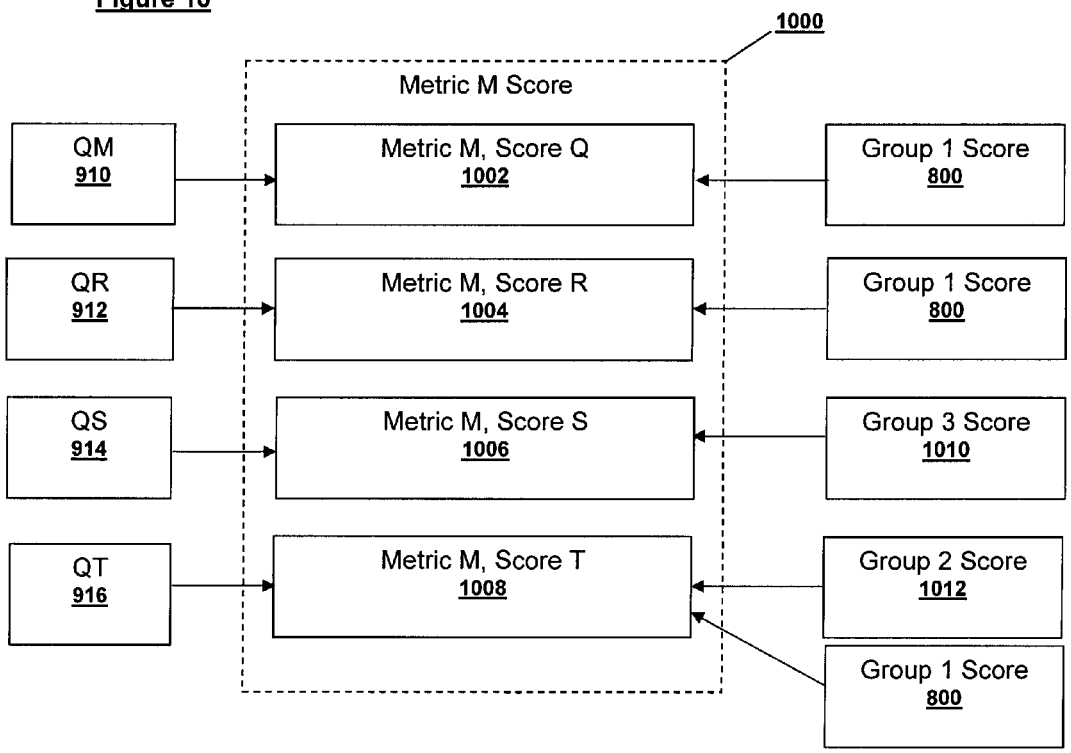
FIG. 10 is a block diagram depicting relationships used to determine scores for a metric.

At step 218, the system may also determine an overall score for a metric, representing how successful the company is in meeting its metric, based on the collected data. For example, FIG. 10 shows an example of overall metric score 1000, based on a plurality of metric sub-scores, 1002-1008. The metric sub-scores are determined based on the metric-sub-metric values 910-918, as well as the group scores 800, 1010, 1012 for one or more groups having strong relationships to the sub-metrics. The system may determine score 1000 for the metric based on one or more of the sub-scores 1002-1008. As described above, the system may output this score using a suitable descriptor or value, at step 220.

Figure 11:
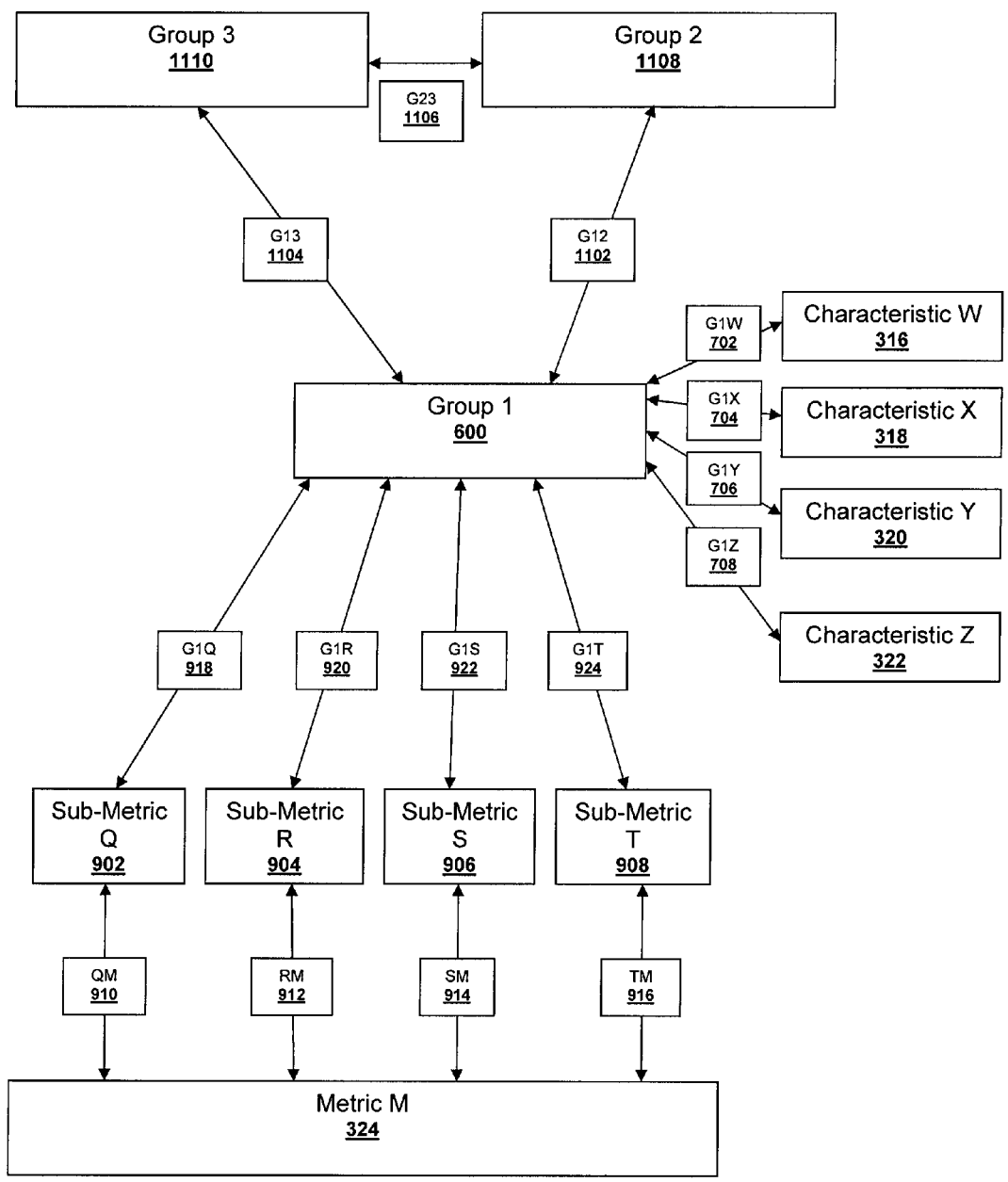
FIG. 11 is a block diagram depicting relationships between groups, characteristics, sub-metrics, and a metric.

FIG. 11 shows another example of the relationships between groups, characteristics, sub-metrics, and the metric. In one embodiment, the system may use a suitable relationship-determining module, as described above, to determine an eighth set of relationships between groups, represented as G12 1102, G13 1104, and G23 1106. The system may identify groups of characteristics that have strong relationships to each other using grouping module 124. In this manner, the system may also create larger groups, in the event that less granularity is desired.

It should be apparent from the above description that a similar process may be performed starting with any metric, sub-metric, or characteristic. For example, the system may perform a similar process to calculate an individual score for a sub-metric with regard to a metric. It should also be apparent that the steps may be performed in any order, and that some steps may be omitted. It will also be apparent to a person having skill in the art that although the example discussed concerns business metrics and customers, the system may be broadly used for other applications as well. For example, an organization may have specific criteria for suitable participants in a clinical trial. In this embodiment, the metric would represent the criteria necessary to be a suitable participant, and the system would allow the organization to identify individuals who had a strong relation to the criteria. Likewise, a metric may be an organization's performance goals for its employees, allowing the system to identify the individual employees with the strongest relationship to those performance goals.

In another aspect of the system, a map of relevant data may be built from internal data, in order to identify relevant characteristics and data sources. For example, an organization may already possess information about its customers or relevant individuals. The system may analyze this data, using the steps described above. The system may use pattern recognition module 126 to identify relevant characteristics. Once the internal data has been processed, the system may use these characteristics when analyzing data from external data sources. This may save time and increase performance, since the system will use fewer irrelevant characteristics when analyzing the new data. Additionally, in this manner, the system may use information describing individuals it is interested in, without revealing any of the individuals' descriptors. This is because only characteristics, groups, or other mapped data is used when accessing external data sources.

Figure 12:
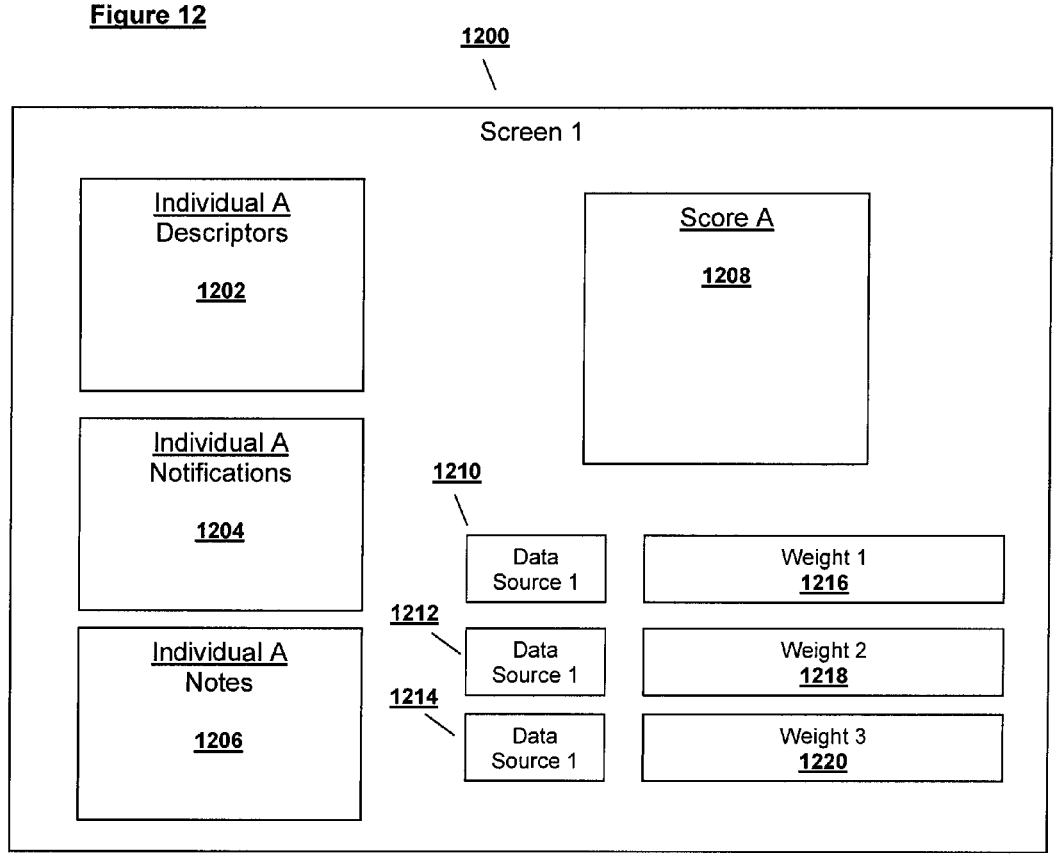
FIG. 12 is a block diagram depicting a sample user screen displaying an individual and a related score.

FIG. 12 shows an exemplary embodiment of a visualization screen for an individual. Screen 1200 may comprise an individual descriptor window 1202, a notification window 1204, a note window 1206, a score window 1208, and one or more data source identifiers 1210-1214 and weight selection windows 1216-1220. Individual descriptor window 1202 may contain information describing an individual, based on the individual descriptor for that individual. Notification window 1204 may display any notifications related to the individual. Note window 1206 may display notes related to an individual. Note window 1206 may also allow remote users to enter notes, which will be stored and associated with the individual's descriptor. Thus, the notes related to an individual may be entered by a user, and associated with that user, or available to all users. Score window 1208 may contain the overall score for the user, relative to a metric, as computed above. Source identifiers 1210-1214 may contain icons, text, or other indicators of data sources that have strong relationships to the individual, as determined above. Weight selection windows 1216-1220 allow remote users to view the current weights assigned to the data sources. Weight selection windows 1216-1220 may also allow remote users to enter new weights for the data sources, causing visualization module 108 to re-calculate relationships and scores as described above. Thus, screen 1200 allows users at remote terminals to view information related to individuals, such as the individual's descriptor, notes, notifications, and score. One or more of these components may be missing, or present in a different quantity, or different positions than shown.

FIG. 13 shows an alternative embodiment of a screen related to an individual. Screen 1300 may comprise an individual descriptor window 1302, notifications window 1304, note window 1306, communication options window 1308, and data sources window 1310. Communication options window may contain one more representations of the preferred communications methods for the individual. Preferred communications methods may be determined by frequency of use, stated preferences, or weights assigned by a user. The preferred communications window may also allow a remote user to select a particular one of the preferred communication methods, in order to send a message to the individual. Upon selection, the system may present the user with a communication screen, allowing the user to enter a message, or otherwise communicate with the individual. One or more of these components may be missing, duplicated, or in different positions than shown.

Figure 14:
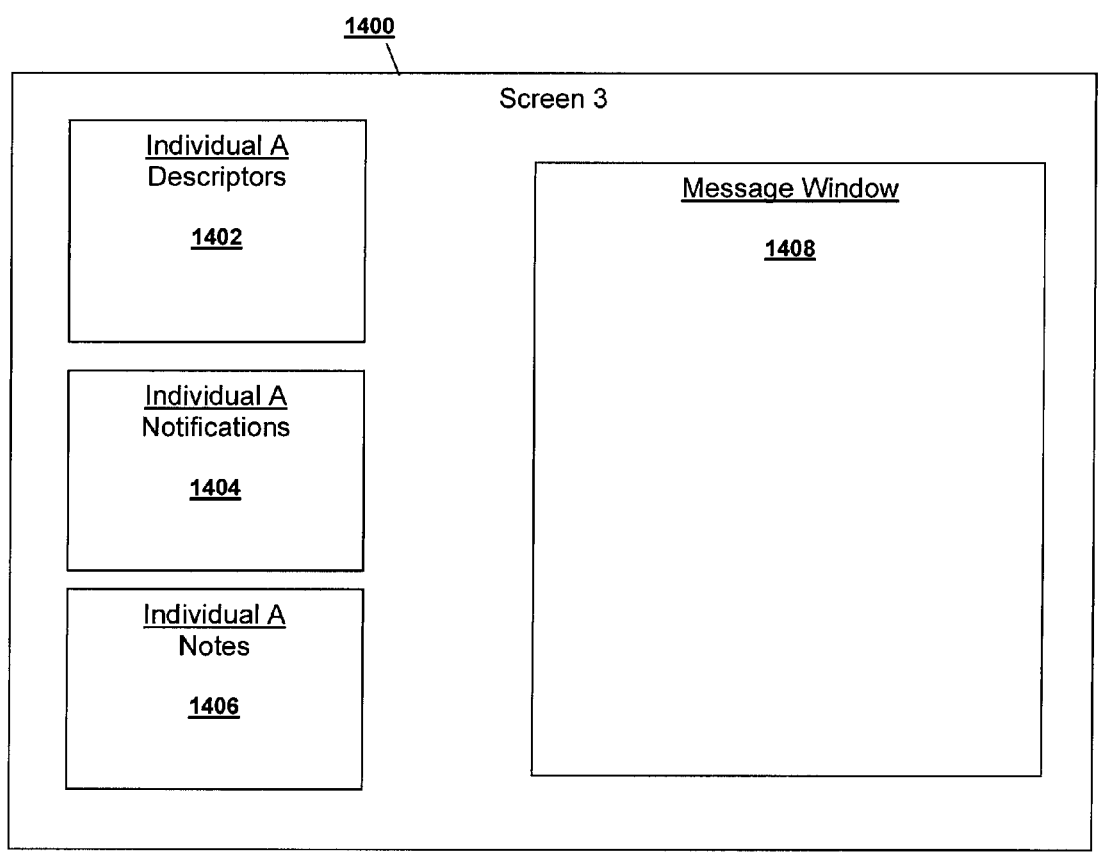
FIG. 14 is a block diagram depicting a sample communication screen for an individual.

FIG. 14 shows exemplary communication screen 1400, allowing a remote user to send a message to the individual. Screen 1400 may comprise an individual descriptor window 1402, notifications window 1404, note window 1406, and message window 1408. Screen 1400 may permit the remote user to enter a message into the message window, or otherwise communicate with the individual. The system may send the message to the individual, using the selected communication medium, such as email, text message, voice message, video, or other communication methods. Alternatively, the system may use existing communication methods such as voice chat, video chat, instant messaging, or phone to permit the user to communicate interactively with the individual. One or more of these components may be missing, duplicated, or in different positions than shown.

Figure 15:
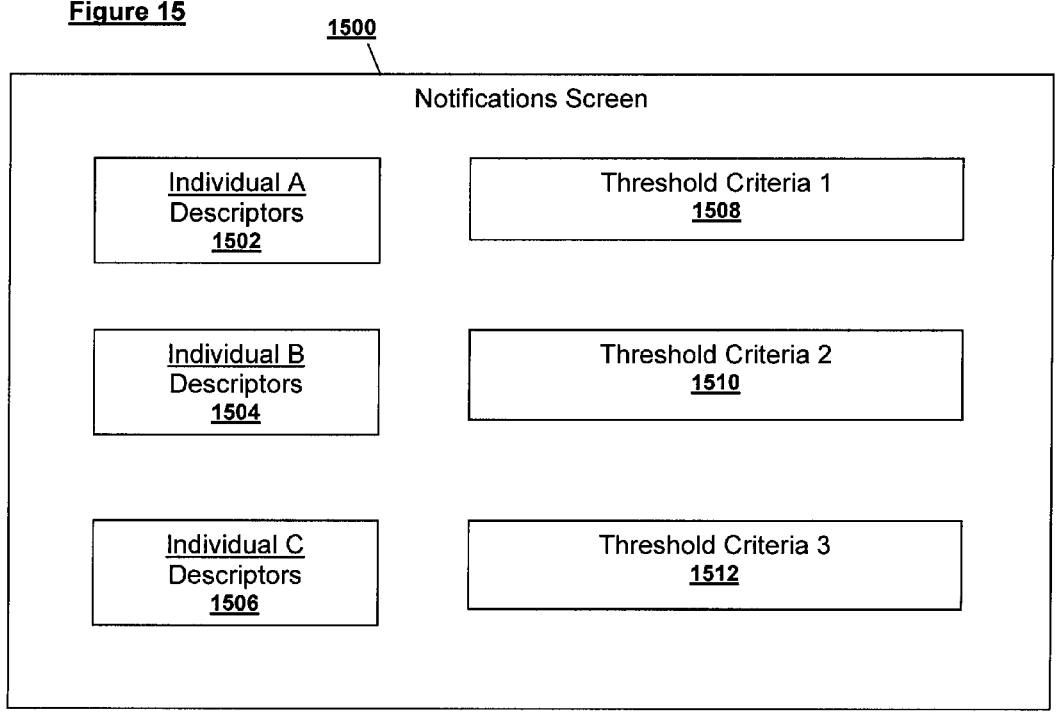
FIG. 15 is a block diagram depicting an example of a general notification screen.

FIG. 15 shows exemplary notification screen 1500, allowing a remote user to view notifications related to multiple individuals. The screen may comprise multiple individual descriptor windows 1502-1506, and one or more threshold criteria windows 1508-1512. Threshold criteria windows 1508-1512 may describe the criteria or event that caused the notifications to be sent. Alternatively or additionally, the threshold criteria windows 1508-1512 may also display one or more data items related to the notification. One or more of these components may be missing, duplicated, or in different positions than shown.

Figure 16:
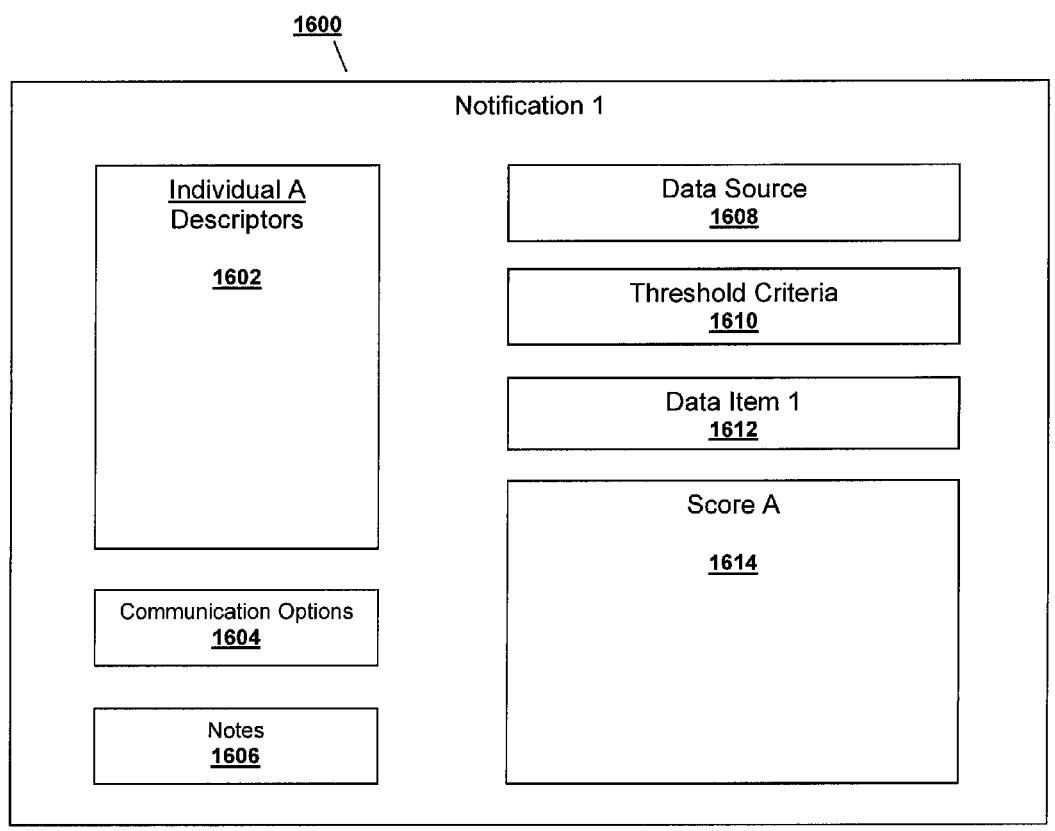
FIG. 16 is a block diagram depicting an example of a specific notification screen for an individual.

FIG. 16 shows exemplary notification screen 1600 for a single individual. The screen may comprise individual descriptor window 1602, communication options window 1604, note window 1606, data source window 1608, threshold criteria window 1610, data item window 1612, and score window 1614. One or more of these components may be missing, duplicated, or in different positions than shown.

As described above, systems and methods consistent with the invention provide a characteristic-based system that allows an organization to identify, organize, describe, and visualize the relationships between individual descriptors, characteristics, and metrics. For purposes of explanation only, certain aspects and embodiments are described herein with reference to the components illustrated in FIGS. 1-16. The functionality of the illustrated components may overlap, however, and may be present in a fewer or greater number of elements and components. Further, all or part of the functionality of the illustrated elements may co-exist or be distributed among several geographically dispersed locations. For example, each "module" may be embodied as a software component, a hardware component, or a combination of a software component and a hardware component. Moreover, embodiments, features, aspects and principles of the present invention may be implemented in various environments and are not limited to the illustrated environments.

Further, the sequences of events described in FIGS. 1-16 are exemplary and not intended to be limiting. Thus, other process stages may be used, and even with the processes depicted in FIGS. 1-16, the particular order of events may vary without departing from the scope of the present invention. Moreover, certain process stages may not be present and additional stages may be implemented in FIGS. 1-16. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of identifying groups of related characteristics, comprising:
   receiving, at a computer:
      a plurality of data items, related to individuals;
      a plurality of descriptors, identifying the individuals;
      a plurality of characteristics, defining categories of the individuals; and
      a metric;
   calculating a first set of relationships between the data items and one or more of the individuals identified by the plurality of descriptors, wherein each relationship comprises a magnitude and direction;
   calculating a second set of relationships between the characteristics and the data items, wherein each relationship comprises a magnitude and direction;
   calculating a third set of relationships between the metric and the characteristics, wherein each relationship comprises a magnitude and direction;
   identifying groups of one or more of the characteristics based on the second set of relationships and the third set of relationships;
   dynamically calculating a metric score based on the identified groups; and
   outputting the metric score.

2. The method of claim 1, comprising:
   calculating a fourth set of relationships between the groups and the characteristics, wherein each relationship comprises a magnitude and direction;
   calculating a fifth set of relationships between the groups and the metric, based on the third and fourth relationships, wherein each relationship comprises a magnitude and direction;
   representing each relationship of the fifth set of relationships with a single descriptor; and
   outputting (i) the fifth set of relationships and (ii) the descriptors.

3. The method of claim 1, comprising:
   calculating a fourth set of relationships between the groups and the characteristics, wherein each relationship comprises a magnitude and direction;
   calculating a sixth set of relationships between the individuals identified by the plurality of descriptors and the characteristics, based on one or more of the first set of relationships and one or more of the second set of relationships, wherein each relationship comprises a magnitude and direction;
   calculating a seventh set of relationships between the individuals identified by the plurality of descriptors and the groups, based on one or more of the fourth set of relationships and one or more of the sixth set of relationships, wherein each relationship comprises a magnitude and direction;
   representing the relationships of the seventh set of relationships with single descriptors; and
   outputting (i) the seventh set of relationships and (ii) the descriptors.

4. The method of claim 1, wherein the data items comprise both structured and unstructured information.

5. The method of claim 4, wherein the structured information comprises quantitative information and the unstructured information comprises qualitative information.

6. The method of claim 1, comprising:
   calculating an eighth set of relationships between one or more of the plurality of groups, wherein each relationship comprises a magnitude and direction; and
   outputting the eighth set of relationships.

7. The method of claim 1, comprising:
   calculating a fourth set of relationships between the groups and the characteristics, wherein each relationship comprises a magnitude and direction;
   identifying new characteristics based on:
      the groups;
      one or more of the fourth set of relationships between the groups and the characteristics; and
      one or more of the second set of relationships between the existing characteristics and the data items; and
   outputting the new characteristics.

8. The method of claim 1, wherein dynamically calculating the metric score based on the identified groups further comprises:
   calculating a fourth set of relationships between the groups and the characteristics, wherein each relationship comprises a magnitude and direction;
   calculating a fifth set of relationships between the groups and the metric, based on one or more of the third set of relationships and one or more of the fourth set of relationships, wherein each relationship comprises a magnitude and direction;

receiving a plurality of sub-metrics;

calculating a ninth set of relationships between the groups and the sub-metrics, wherein each relationship comprises a magnitude and direction;

calculating a tenth set of relationships between the sub-metrics and the metrics, wherein each relationship comprises a magnitude and direction;

calculating a set of metric sub-scores based on one or more of the fifth set of relationships and one or more of the tenth set of relationships, wherein each relationship comprises a magnitude and direction;

dynamically calculating a metric score based on one or more of the set of metric sub-scores;

representing the metric score with a single descriptor; and outputting the descriptor.

9. The method of claim 1, wherein dynamically calculating the metric score based on the identified groups further comprises:

receiving data items comprising both qualitative and structured information and quantitative and unstructured information;

identifying new characteristics based on;
the groups;
the relationships between the groups and the data items; and
the relationships between existing characteristics and the data items;

calculating a fourth set of relationships between the groups and the characteristics, wherein each relationship comprises a magnitude and direction;

calculating a fifth set of relationships between the groups and the metric based on (i) one or more or the third set of relationships and (ii) one or more of the fourth set of relationships, wherein each relationship comprises a magnitude and direction;

calculating a sixth set of relationships between the individuals identified by the plurality of descriptors and the characteristics, based on one or more of the first set of relationships and one or more of the second set of relationships, wherein each relationship comprises a magnitude and direction;

calculating a seventh set of relationships between the individuals identified by the plurality of descriptors and the groups based on one or more of the fourth set of relationships and one or more of the sixth set of relationships, wherein each relationship comprises a magnitude and direction;

receiving a plurality of sub-metrics;

calculating a ninth set of relationships between the groups and the sub-metrics, wherein each relationship comprises a magnitude and direction;

calculating a tenth set of relationships between the sub-metrics and the metrics, wherein each relationship comprises a magnitude and direction;

calculating a set of metric sub-scores, based on one or more of the fifth set of relationships and one or more of the tenth set of relationships;

dynamically calculating a metric score based on one or more of the set of metric sub-scores;

representing the metric score with a single descriptor; and outputting the descriptor.

10. The method of claim 9, wherein members of the first through tenth sets of relationships comprise a direction that may be positive, neutral, or negative.

11. A non-transitory computer-readable storage medium encoded with instructions which, when executed on a processor, perform a method of identifying groups of related characteristics, the method comprising:

receiving, at a computer:
a plurality of data items, related to individuals;
a plurality of descriptors, identifying the individuals;
a plurality of characteristics, defining categories of individuals; and
a metric;

calculating a first set of relationships between data items and specific ones of the individuals identified by the plurality of descriptors;

calculating second set of relationships between characteristics and data items, wherein each relationship comprises a magnitude and direction;

calculating a third set of relationships between the metric and the characteristics, wherein each relationship comprises a magnitude and direction;

identifying groups of one or more characteristics based on the second set of relationships and the third set of relationships;

dynamically calculating a metric score based on the identified groups; and outputting the metric score.

12. The storage medium of claim 11, wherein the method comprises:

calculating a fourth set of relationships between the groups and the characteristics, wherein each relationship comprises a magnitude and direction;

calculating a fifth set of relationships between the groups and the metric based on one or more of the third set of relationships and one or more of the fourth set of relationships, wherein each relationship comprises a magnitude and direction;

representing the relationships of the fifth set of relationships with single descriptors; and outputting the fifth set of relationships and descriptors.

13. The storage medium of claim 11, wherein the method comprises:

calculating a fourth set of relationships between the groups and the characteristics, wherein each relationship comprises a magnitude and direction;

calculating a sixth set of relationships between the individuals identified by the plurality of descriptors and the characteristics, based on one or more of the first set of relationships and one or more of the second set of relationships, wherein each relationship comprises a magnitude and direction;

calculating a seventh set of relationships between specific ones of the individuals identified by the plurality of descriptors and the groups based on one or more of the fourth set of relationships and one or more of the sixth set of relationships, wherein each relationship comprises a magnitude and direction;

representing the relationships in the seventh set of relationships with single descriptors; and outputting the seventh set of relationships and descriptors.

14. The storage medium of claim 11, wherein the method comprises:

calculating an eighth set of relationships between each of the plurality of groups, wherein each relationship comprises a magnitude and direction; and outputting the eighth set of relationships.

15. The storage medium of claim 11, wherein the method comprises:
- calculating a fourth set of relationships between the groups and the characteristics, wherein each relationship comprises a magnitude and direction;
- identifying new characteristics based on;
  - the groups;
  - one or more of the fourth set of relationships between the groups and the characteristics; and
  - one or more of the second set of relationships between the existing characteristics and the data items; and
- outputting the new characteristics.

16. The storage medium of claim 11, wherein dynamically calculating a metric score based on the identified groups comprises:
- calculating a fourth set of relationships between the groups and the characteristics, wherein each relationship comprises a magnitude and direction;
- calculating a fifth set of relationships between the groups and the metric based on one or more of the third set of relationships and one or more of the fourth set of relationships, wherein each relationship comprises a magnitude and direction;
- receiving a plurality of sub-metrics;
- calculating a ninth set of relationships between the groups and the sub-metrics, wherein each relationship comprises a magnitude and direction;
- calculating a tenth set of relationships between the sub-metrics and the metrics, wherein each relationship comprises a magnitude and direction;
- calculating a set metric sub-scores, based on one or more of the fifth set of relationships and one or more of the tenth set of relationships;
- dynamically calculating a metric score based on one or more of the set of metric sub-scores;
- representing the metric score with a single descriptor; and
- outputting the descriptor.

17. The storage medium of claim 11, wherein dynamically calculating a metric score based on the identified groups comprises:
- receiving data items comprising both qualitative and structured information and quantitative and unstructured information;
- calculating a fourth set of relationships between the groups and the characteristics, wherein each relationship comprises a magnitude and direction;
- identifying new characteristics based on;
  - the groups;
  - one or more of the fourth set of relationships between the groups and the characteristics; and
  - one or more of the second set of relationships between existing characteristics and the data items;
- calculating a fifth set of relationships between the groups and the metric based on one or more of the third set of relationships and one or more of the fourth set of relationships, wherein each relationship comprises a magnitude and direction;
- calculating a sixth set of relationships between the individuals identified by the plurality of descriptors and characteristics, based on one or more of the first set of relationships and one or more of the second set of relationships, wherein each relationship comprises a magnitude and direction;
- calculating a seventh set of relationships between specific ones of the individuals identified by the plurality of descriptors and the groups based on one or more of the fourth set of relationships and one or more of the sixth set of relationships, wherein each relationship comprises a magnitude and direction;
- receiving a plurality of sub-metrics;
- calculating a ninth set of relationships between the groups and the sub-metrics, wherein each relationship comprises a magnitude and direction;
- calculating a tenth set of relationships between the sub-metrics and the metrics, wherein each relationship comprises a magnitude and direction;
- calculating a set of metric sub-scores, based on one or more of the fifth set of relationships and one or more of the tenth set of relationships, wherein each relationship comprises a magnitude and direction;
- dynamically calculating a metric score, based on one or more of the set of metric sub-scores, wherein each relationship comprises a magnitude and direction;
- representing the metric score with a single descriptor; and
- outputting the descriptor.

18. The storage medium of claim 17, wherein members of the first through tenth sets of relationships comprise a direction that may be positive, neutral, or negative.

19. A characteristic-based server to identify groups of related characteristics of individuals, the server comprising;
- a data collection module to gather data items from a plurality of data sources;
- a relationship analysis module to:
  - calculate a first set of relationships between data items and specific ones of the individuals identified by the plurality of descriptors, wherein each relationship comprises a magnitude and direction;
  - calculate a second set of relationships between the characteristics and data items, wherein each relationship comprises a magnitude and direction;
  - calculate a sixth set of relationships between the individuals identified by the plurality of descriptors and the characteristics, based on one or more of the first set of relationships and one or more of the second set of relationships, wherein each relationship comprises a magnitude and direction;
  - calculate a third set of relationships between the metric and the characteristics, wherein each relationship comprises a magnitude and direction; and
  - dynamically calculate a metric score based on groups of characteristics; and
- a grouping module to identify groups of related characteristics based on one or more of the second set of relationships and one or more of the third set of relationships.

20. The server of claim 19, wherein the relationship module is further operative to calculate:
- a fourth set of relationships between the groups and the characteristics, wherein each relationship comprises a magnitude and direction;
- a fifth set of relationships between the groups and the metric based on one or more of the third set of relationships and one or more of the fourth set of relationships, wherein each relationship comprises a magnitude and direction; and
- descriptors representing the relationships of the fifth set of relationships.

21. The server of claim 19, wherein the relationship module is further operative to calculate:
- a fourth set of relationships between the groups and the characteristics, wherein each relationship comprises a magnitude and direction;
- a sixth set of relationships between the individuals identified by the plurality of descriptors and the characteristics, based on one or more of the first set of relationships and one or more of the second set of relationships, wherein each relationship comprises a magnitude and direction;

a seventh set of relationships between specific ones of the individuals identified by the plurality of descriptors and the groups based on one or more of the fourth relationships and one or more of the sixth relationships, wherein each relationship comprises a magnitude and direction; and descriptors representing the relationships of the seventh set of relationships.

22. The server of claim 19, wherein the relationship module is further operative to calculate an eighth set of relationships between each of the plurality of groups and output the relationships, wherein each relationship comprises a magnitude and direction.

23. The server of claim 22, wherein the characteristic-based server further comprises:
a pattern recognition module to recognize new characteristics based on;
the groups;
one or more of the fourth set of relationships between the groups and the characteristics; and
one or more of the second set of relationships between the existing characteristics and the data items.

24. The server of claim 19, wherein the relationship module is further operative to;
calculate a fourth set of relationships between the groups and the characteristics, wherein each relationship comprises a magnitude and direction;
calculate a fifth set of relationships between the groups and the metric based on one or more of the third set of relationships and one or more of the fourth set of relationships, wherein each relationship comprises a magnitude and direction;
receive a plurality of sub-metrics;
calculate a ninth set of relationships between the groups and the sub-metrics, wherein each relationship comprises a magnitude and direction;
calculate a tenth set of relationships between the sub-metrics and the metrics, wherein each relationship comprises a magnitude and direction;
calculate a set of metric sub-scores, based on one or more of the fifth set of relationships and one or more of the tenth set of relationships;
dynamically calculate an overall metric score based on one or more of the set of metric sub-scores;
represent the overall metric score with a single descriptor; and
output the descriptor.

25. The server of claim 19, wherein;
the data items comprise both qualitative and structured information and quantitative and unstructured information;
the relationship module is further operative to:
calculate a fourth set of relationships between the groups and the characteristics, wherein each relationship comprises a magnitude and direction;
calculate a fifth set of relationships between the groups and the metric, based on one or more of the third set of relationships and one or more of the fourth set of relationships, wherein each relationship comprises a magnitude and direction;
calculate a sixth set of relationships between the individuals identified by the plurality of descriptors and the characteristics, based on one or more of the first set of relationships and one or more of the second set of relationships, wherein each relationship comprises a magnitude and direction;
calculate a seventh set of relationships between specific ones of the individuals identified by the plurality of descriptors and the groups, based on one or more of the fourth set of relationships and one or more of the sixth set of relationships, wherein each relationship comprises a magnitude and direction;
receive a plurality of sub-metrics;
calculate a ninth set of relationships between the groups and the sub-metrics, wherein each relationship comprises a magnitude and direction;
calculate a tenth set of relationships between the sub-metrics and the metrics, wherein each relationship comprises a magnitude and direction;
calculate a set of metric sub-scores, based on one or more of the fifth set of relationships and one or more of the tenth set of relationships;
dynamically calculate a metric score, based on one or more of the set of metric sub-scores;
represent the metric score with a single descriptor; and
output the descriptor; and
the pattern recognition module is further operative to identify new characteristics based on;
the groups;
one or more of the fourth relationships between the groups and the characteristics; and
one or more of the second relationships between existing characteristics and the data items.

26. The server of claim 25, wherein members of the first through tenth sets of relationships comprise a direction that may be positive, neutral, or negative.

* * * * *